(12) United States Patent
Hureau et al.

(10) Patent No.: US 12,332,724 B2
(45) Date of Patent: Jun. 17, 2025

(54) PROCESSING WAKEUP REQUESTS IN A PROCESSING SYSTEM HAVING POWER MANAGEMENT CIRCUITRY AND A PROCESSING CIRCUITRY

(71) Applicant: NXP USA, Inc., Austin, TX (US)

(72) Inventors: Loic Hureau, Sainte Marie d'Attez (FR); Mohit Satsangi, New Delhi (IN); Ray Charles Marshall, Herts (GB); Thomas Henry Luedeke, Oberbergkirchen (DE)

(73) Assignee: NXP USA, Inc., Austin, TX (US)

( * ) Notice: Subject to any disclaimer, the term of this patent is extended or adjusted under 35 U.S.C. 154(b) by 142 days.

(21) Appl. No.: 18/480,116

(22) Filed: Oct. 3, 2023

(65) Prior Publication Data

US 2024/0118742 A1 Apr. 11, 2024

(30) Foreign Application Priority Data

Oct. 5, 2022 (EP) .................................. 22306495

(51) Int. Cl.
*G06F 1/00* (2006.01)
*G06F 1/3296* (2019.01)

(52) U.S. Cl.
CPC ................................ *G06F 1/3296* (2013.01)

(58) Field of Classification Search
CPC . G06F 1/3296; G06F 1/24; G06F 1/26; G06F 1/3206; G06F 1/3243; G06F 11/0757; G06F 11/076; G06F 1/3293
See application file for complete search history.

(56) References Cited

U.S. PATENT DOCUMENTS

| 9,128,718 | B1 * | 9/2015 | Lachwani | G06F 1/3275 |
| 9,456,413 | B2 * | 9/2016 | Caskey | H04W 52/0274 |
| 11,175,723 | B2 | 11/2021 | Hureau et al. | |
| 2009/0228695 | A1 * | 9/2009 | Pathak | H04L 12/12 713/1 |
| 2010/0151919 | A1 * | 6/2010 | Caskey | H04W 52/0274 455/574 |
| 2011/0022859 | A1 | 1/2011 | More et al. | |
| 2013/0031388 | A1 * | 1/2013 | Sakarda | G06F 9/4418 713/320 |

(Continued)

FOREIGN PATENT DOCUMENTS

EP 3742257 A1 11/2020

*Primary Examiner* — Xuxing Chen
(74) *Attorney, Agent, or Firm* — Joanna G. Geld

(57) ABSTRACT

Power management circuitry includes a power management circuitry having a handshake watchdog (HWD) timer and configured to, upon a reset, set the HWD timer to a maximum delay time allowed between an initial wakeup request received at a first input and a qualified wakeup request expected at a second input and configured to start the HWD timer counting in response to the initial wakeup request. Processing circuitry includes a wakeup signal aggregator configured to receive wakeup signals from internal and external wakeup events and to provide a notification of an occurrence of a wakeup event. The notification is provided as the initial wakeup request. A low power mode sequencer configured to initiate a low power mode exit sequence in response to the notification from the wakeup signal aggregator and to provide the qualified wakeup request as a result of performing at least a portion of the exit sequence.

20 Claims, 6 Drawing Sheets

(56) References Cited

U.S. PATENT DOCUMENTS

| | | |
|---|---|---|
| 2015/0362987 A1 | 12/2015 | Shin et al. |
| 2016/0014700 A1 | 1/2016 | Taha et al. |
| 2016/0349833 A1 | 12/2016 | Hara |
| 2016/0378168 A1* | 12/2016 | Branover .............. G06F 1/3203 713/323 |
| 2018/0186316 A1* | 7/2018 | Harvey .................... B60L 7/12 |
| 2020/0371581 A1* | 11/2020 | Hureau ................. G06F 1/3206 |
| 2023/0171698 A1* | 6/2023 | Wei ....................... H04W 72/23 370/318 |

* cited by examiner

PROCESSING WAKEUP REQUESTS IN A PROCESSING SYSTEM HAVING POWER MANAGEMENT CIRCUITRY AND A PROCESSING CIRCUITRY

CROSS-REFERENCE TO RELATED APPLICATIONS

This application claims the priority under 35 U.S.C. § 119 of application Ser. No. 22/306,495.7, filed on 5 Oct. 2022, the contents of which are incorporated by reference herein.

BACKGROUND

Field

This disclosure relates generally to processing systems, more specifically, to the processing of wakeup requests in a processing system having power management circuitry and processing circuitry.

Related Art

Safety is a concern for certain applications, such as automotive applications or industrial applications and the like. A processor or processing unit, such as a microprocessor, microcontroller, system on chip or any other processing configuration, may be used to process any type of data or information to control certain parameters, functions or operations associated with a particular application. Automotive applications may include, for example, gateways (e.g., in-vehicle networking and telematics), adaptive driver assistance systems (ADAS), infotainment (audio and/or video entertainment, information, navigation, hands-free control, etc.), clusters (digital instrumentation, heads-up display, etc.), vehicle to everything (V2X) (e.g., communication between a vehicle and external entities, traffic sign recognition, etc.), radar, vision (e.g., cameras, proximity sensors, collision avoidance, blind spot monitoring, etc.). Industrial applications may include, for example, industrial tablets or laptops and the like, internet protocol television (IPTV), industrial control, medical monitoring, home automation and/or alarm systems, etc.

A processor may have a low power mode, such as a standby mode or the like, to minimize power consumption during periods of inactivity in which all but a minimum amount of logic is powered down. An external Power Management IC (PMIC) may be used to provide supply voltage to the processor and may further be used to control the power mode of the processor including transitioning between normal and low power modes. In such a configuration, any miscommunication between the processor and the PMIC could lead to power being removed at an incorrect time, causing the processor and any corresponding peripherals to be unexpectedly powered down. For applications in which safety is a concern including safety critical applications, the consequences of unexpected power down could be inconvenient or even dangerous in the event the system is unable to transition to a safe state. Also, a broken communication or processor level fault may result in the processor staying in the low power mode indefinitely.

In one existing solution, a periodic watchdog (PWD) timer is used to prevent the processor from becoming stuck in the standby mode and not waking up. This timer will automatically restart the processor by doing a full power cycle. Therefore, with each periodic wakeup, at least a portion of the processor wakes up and becomes functional so as to service the timer. However, the use of such a PWD timer forces wakeups, even when a wakeup may not be needed, thus consuming energy unnecessarily and having the system wakeup for only limited tasks. In addition to the significant consumption of energy resulting from the periodic wakeups, there can be a significant delay in detecting any faults in the wakeup mechanism due to the time out period of the periodic watchdog timer. Therefore, a need exist for an improved mechanism for processing wakeup requests which allows for the timely detection of faults in the wakeup mechanism, and which may also result in a reduction in overall power consumption at the system level.

SUMMARY

In accordance with a first aspect of the present disclosure, a processing system is provided, comprising: power management circuitry comprising a handshake watchdog (HWD) timer, a first input, and a second input, wherein the power management circuitry is configured to, upon a reset, set the HWD timer to a maximum delay time allowed between an initial wakeup request received at the first input and a qualified wakeup request expected at the second input and configured to start the HWD timer counting in response to the initial wakeup request; and processing circuitry coupled to the power management circuitry, the processing circuitry comprising: a wakeup signal aggregator configured to receive wakeup signals from internal wakeup events and external wakeup events and configured to provide a notification of an occurrence of a wakeup event corresponding to any one of the received wakeup signals, wherein the notification is provided as the initial wakeup request to the power management circuitry; and a low power mode sequencer configured to initiate a low power mode exit sequence in response to the notification from the wakeup signal aggregator and configured to provide the qualified wakeup request as a result of performing at least a portion of the low power mode exit sequence.

In one or more embodiments, the initial wakeup request and the qualified wakeup request both result from the wakeup event.

In one or more embodiments, the power management circuitry is configured to reset the processing circuitry in response to the HWD timer expiring without having received the qualified wakeup request expected at the second input.

In one or more embodiments, the power management circuitry further comprises a power supply configured to provide a power supply voltage to the processing circuitry, wherein, during a standby mode, the power supply is turned off.

In one or more embodiments, the power management circuitry is configured to power up the power supply voltage to exit standby mode in response to the qualified wakeup request and not the initial wakeup request.

In one or more embodiments, the initial wakeup request is not generated as part of the low power mode exit sequence.

In one or more embodiments, the notification provided by the wakeup signal aggregator and the initial wakeup request are provided without use of clock signal.

In one or more embodiments, the power management circuitry further comprises: a periodic watchdog (PWD) timer, wherein the power management circuitry is configured to, while in standby mode, power up to service the PWD timer each time the PWD timer expires, regardless of whether a wakeup event has occurred or not.

In one or more embodiments, servicing the PWD timer includes setting the PWD timer to a maximum delay time allowed between wakeups.

In one or more embodiments, the internal wakeup events occur within the processing system and are further characterized as on-chip wakeup events.

In accordance with a second aspect of the present disclosure, a method for use in a processing system having power management circuitry and a processor is conceived, comprising: entering standby mode; receiving, at the power management circuitry, an initial wakeup request from the processor, wherein the initial wakeup request is generated by the processor in response to detecting occurrence of a wakeup event; starting a handshake watchdog (HWD) timer counting by the power management circuitry in response to receiving the initial wakeup request; and in response to receiving, at the power management circuitry, a qualified wakeup request prior to the HWD timer expiring, wherein the qualified wakeup request is generated by the processor during a low power mode exit sequence performed in response to the initial wakeup request, exiting standby mode.

In one or more embodiments, the method further comprises: in response to the HWD timer expiring without having received the qualified wakeup request, performing a reset of the processing system.

In one or more embodiments, the exiting standby mode further comprises: powering up a power supply voltage of the processor, in response to the qualified wakeup request, to exit the standby mode.

In one or more embodiments, the power supply voltage is not powered up in response to the initial wakeup request.

In one or more embodiments, the method further comprises: upon powering up to enter normal mode, setting the HWD timer a maximum delay time allowed between any initial wakeup request and its corresponding qualified wakeup request.

In one or more embodiments, the method further comprises: upon powering up to enter normal mode, setting a periodic watchdog (PWD) timer to a maximum delay time allowed between wakeups; starting the PWD timer counting in response to entering the standby mode; and in response to the periodic watchdog timer expiring, resetting the processing system, regardless of whether any wakeup event has occurred or not.

In one or more embodiments, the method further comprises: starting, by the processor, the low power mode exit sequence in response to the initial wakeup request.

In one or more embodiments, the wakeup event is one of an internal wakeup event or an external wakeup event.

In accordance with a third aspect of the present disclosure, a processing system is provided, comprising: a power management integrated circuit (PMIC) comprising a handshake watchdog (HWD) timer, a first PM IC pin, and a second PMIC pin, wherein the power management circuitry is configured to, upon a reset, set the HWD timer to a maximum delay time allowed between an initial wakeup request received at the first PM IC pin and a qualified wakeup request expected at the second PMIC pin and configured to start the HWD timer counting in response to the initial wakeup request at the first PM IC pin; and an application processor coupled to the PM IC, the processor comprising: a first processor pin and a second processor pin; a wakeup signal aggregator configured to receive wakeup signals from on-chip wakeup events and external wakeup events and configured to asynchronously provide a notification of an occurrence of a wakeup event corresponding to any one of the received wakeup signals, wherein the notification is provided as the initial wakeup request from the first processor pin to the first PM IC pin; and a low power mode sequencer configured to initiate a low power mode exit sequence in response to the notification from the wakeup signal aggregator and configured to provide the qualified wakeup request as a result of performing at least a portion of the low power mode exit sequence, wherein the qualified wakeup request is provided from the second processor pin to the second PM IC pin.

In one or more embodiments, the PMIC further comprises a power supply configured to provide a power supply voltage to a power supply pin of the processor, wherein, during a standby mode, the power supply is turned off, and wherein: the PMIC is further configured to power up the power supply voltage to exit standby mode in response to the qualified wakeup request and maintain the power supply off in response to the initial wakeup request.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

In a processing system, an improved low power mode exit handshake between a power management integrated circuit (PM IC) and a processor (such as a safety application processor) with dedicated interactions ensure that transitions between normal mode and low power mode occur in a safe and robust manner. The normal mode means that the system is fully powered to perform the functions and operations for which the system was designed. The low power mode represents any reduced power mode (e.g., reduced power mode, sleep mode, standby mode, etc.) that reduces quiescent current in order to reduce overall power consumption. In one embodiment, the processor may be configured to generate both an initial, unqualified wakeup request to the PMIC, followed at some time later, by an actual (i.e., qualified) wakeup request to the PM IC. When operating correctly, these two requests should be separated by a maximum length of time, and if the actual wakeup request does not follow within the maximum length of time of the initial wakeup request, a fault is indicated.

Therefore, in one aspect, the PMIC detects, with the use of a handshake watchdog (HWD) timer, whether the actual wakeup request (i.e., actual wakeup indicator) properly follows the initial wakeup request (i.e., initial wakeup indicator), as expected. For example, the PMIC triggers the HWD timer in response to the initial wakeup request, and if the HWD timer expires before receiving the corresponding actual wake up request, a fault is indicated and the system is reset, entering a power-up cycle. In this manner, the handshake watchdog timer only needs to be triggered if an initial wakeup request is received, rather than performing periodic wakeups. The use of such a handshake watchdog timer for exiting a low power mode may, for example, remove the potential for a critical failure and help reduce overall power consumption. While the handshake watchdog (HWD) timer, in some embodiments, may be used in addition to a periodic watchdog (PWD) timer which results in periodic wakeups, overall system power consumption may be further reduced by using the HWD timer without also using the PWD timer.

Figure 1:
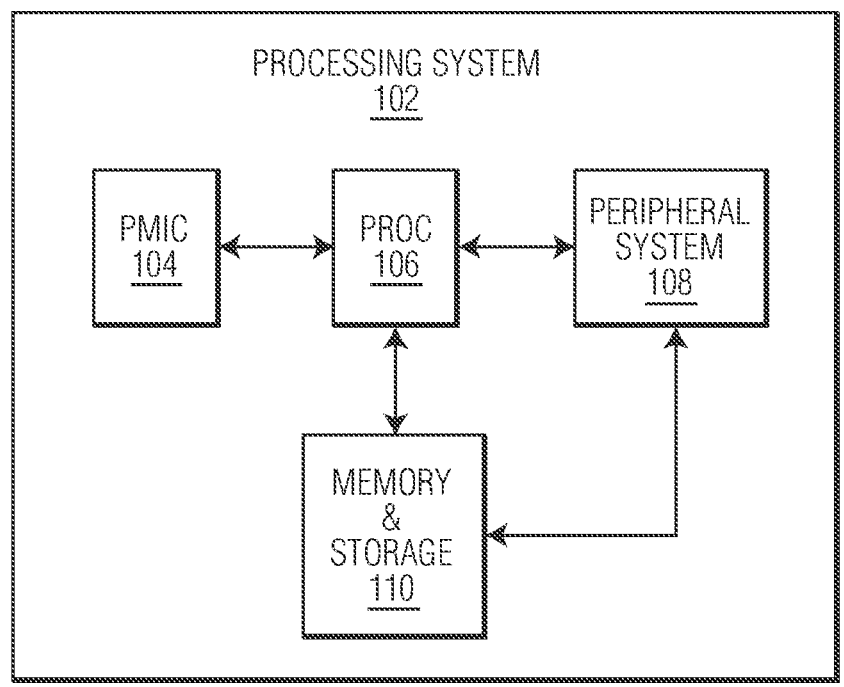
FIG. 1 illustrates, in block diagram form, a processing system having a power management integrated circuit (PMIC) and a processor, in accordance with one embodiment of the present invention.

FIG. 1 is a simplified block diagram of a processing system 102 implemented according to one embodiment of the present disclosure. Processing system 102 may be implemented in a discrete manner or may be integrated onto a single module, such as a system on chip (SoC) or the like. Processing system 102 includes a power management IC (PM IC) 104, a processor 106, peripheral system 108, and a memory and storage module 110. PMIC 104 cooperates with processor 106 to ensure that power mode transitions of processor 106 (and transitions of any other devices powered by PM IC 104) take place in a robust and secure manner to reduce potential of failure as further described herein. Processor 106 may include any type of processing circuitry, device, or system, such as, for example, a programmable integrated circuit, a microprocessor, a microcontroller or MCU, a central processing unit (CPU), an application processor, etc., and may include multiple processing devices. For example, in one embodiment, processor 106 is a safety application processor. Memory and storage module 110 may include one or more of any type of memory or storage devices or any combination thereof, including, for example, random access memory (RAM), dynamic RAM (DRAM), synchronous DRAM (SDRAM), non-volatile (NV) memory such as NVRAM, Flash memory, solid state drives (SSDs), hard disk drives, optical drives, or any other suitable form of internal or external storage. The memory and storage devices may be incorporated in processing system 102, or instead, some or all of memory and storage module 110 may be configured as interfaces to external memory or drives or the like.

Processing system 102 may be used to implement or may be part of an automotive application or an industrial application or the like in which safety and robustness are of concern. Peripheral system 108 may be used to interface sensors, communication devices, detectors, display devices, keyboards, controllers, mice, etc., to enable processor 106 to process any type of data or information to control certain parameters, functions or operations associated with the particular application. In many such applications, processor 106 includes a low power mode to reduce power consumption in which only a minimal amount of logic and circuitry remains powered sufficient to reawaken processing system 102 to resume normal operations. PMIC 104 controls the supply voltage provided to the processor 106 (and any other peripherals) and further facilitates transitioning processor 106 between its normal and low power modes as further described herein. PMIC 104 also has a low power mode, referred to herein as a standby mode, in which it maintains a very low yet sufficient level of operation to detect requests by processor 106 to reawaken the system.

Figure 2:
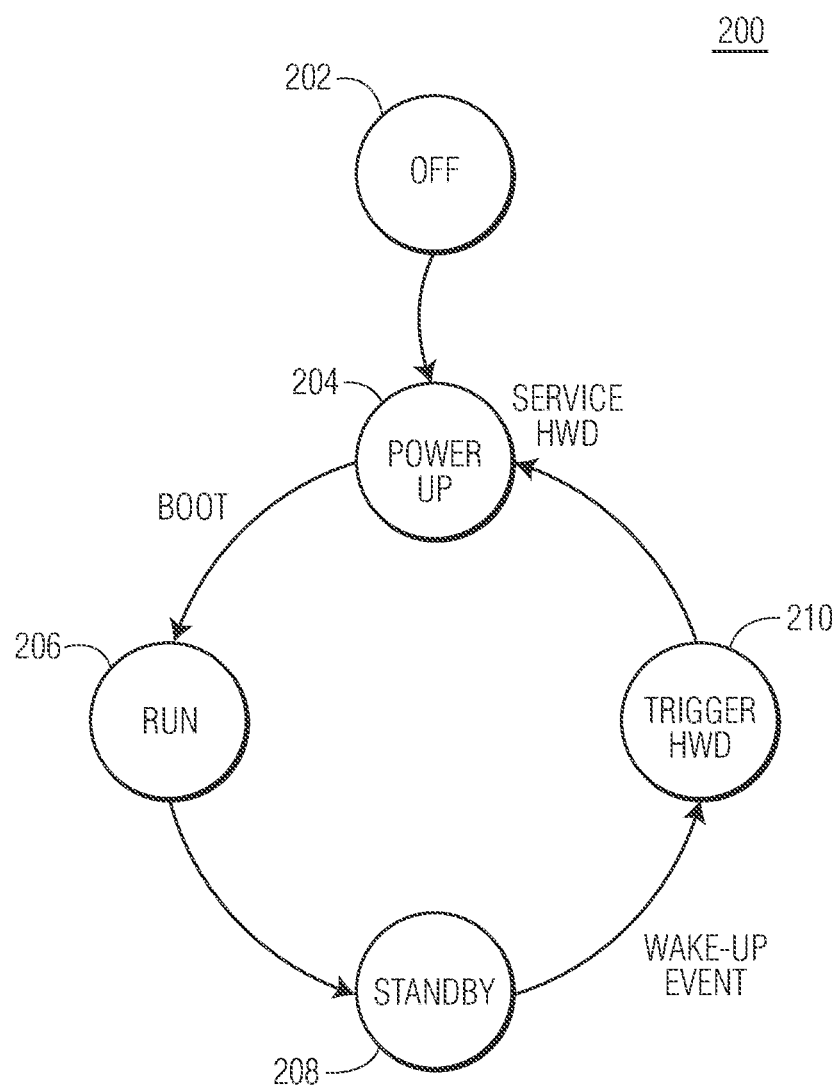
FIG. 2 illustrates a simplified state diagram for the PMIC of FIG. 1, in accordance with one embodiment of the present invention.

FIG. 2 illustrates a simplified state diagram 200 of a handshake wakeup scheme, in accordance with one embodiment of the present invention, in which the HWD timer is only engaged when a wakeup event has been detected rather than requiring a periodic wakeup. State 202 corresponds to the off state in which the processing system is off. Upon power-up, state diagram 200 transitions from state 202 to state 204 in which the processing system powers up. Upon completion of a boot sequence upon power-up, state diagram 200 transitions from state 204 to state 206, in which the processing system operates in normal mode. At some point during operation in normal mode, an entry into low power mode is requested by the processor and state diagram 200 transitions from state 206 into state 208. At this point, processing system is in standby mode (i.e., low power mode) and awaits a wakeup event to come out of standby mode.

In the illustrated embodiment, a wakeup event causes the transition from state 208 to state 210. As will be described below, the wakeup event is initiated by an initial wakeup request, which begins the low power mode exit sequence to actually exit low power mode. Upon transitioning to state 210, the HWD is triggered to start operating (e.g., counting). The HWD timer can be programmed to a timeout value that represents a maximum allowable time between the initial wakeup request and the corresponding actual wakeup request (in which the initial wakeup request may be referred to as an unqualified wakeup request, and the actual wakeup request a qualified wakeup request). Upon entering state 204, the HWD timer is serviced by, e.g., resetting it to its timeout value. If the corresponding actual wakeup request is received before the HWD timer expires, no fault is indicated, and the processing system powers up normally in response to the actual wakeup request. If, however, the HWD expires without having received the corresponding actual wakeup request, a HWD fault is indicated (in which this indication may be stored in a register for subsequent analysis). The processing system can then be reset in response to the expiration of the HWD timer (also returning to state 204, but in response to expiration of the HWD timer rather than a wakeup request). More detailed descriptions will be provided with respect to the timing diagrams and state diagrams below.

Figure 3:
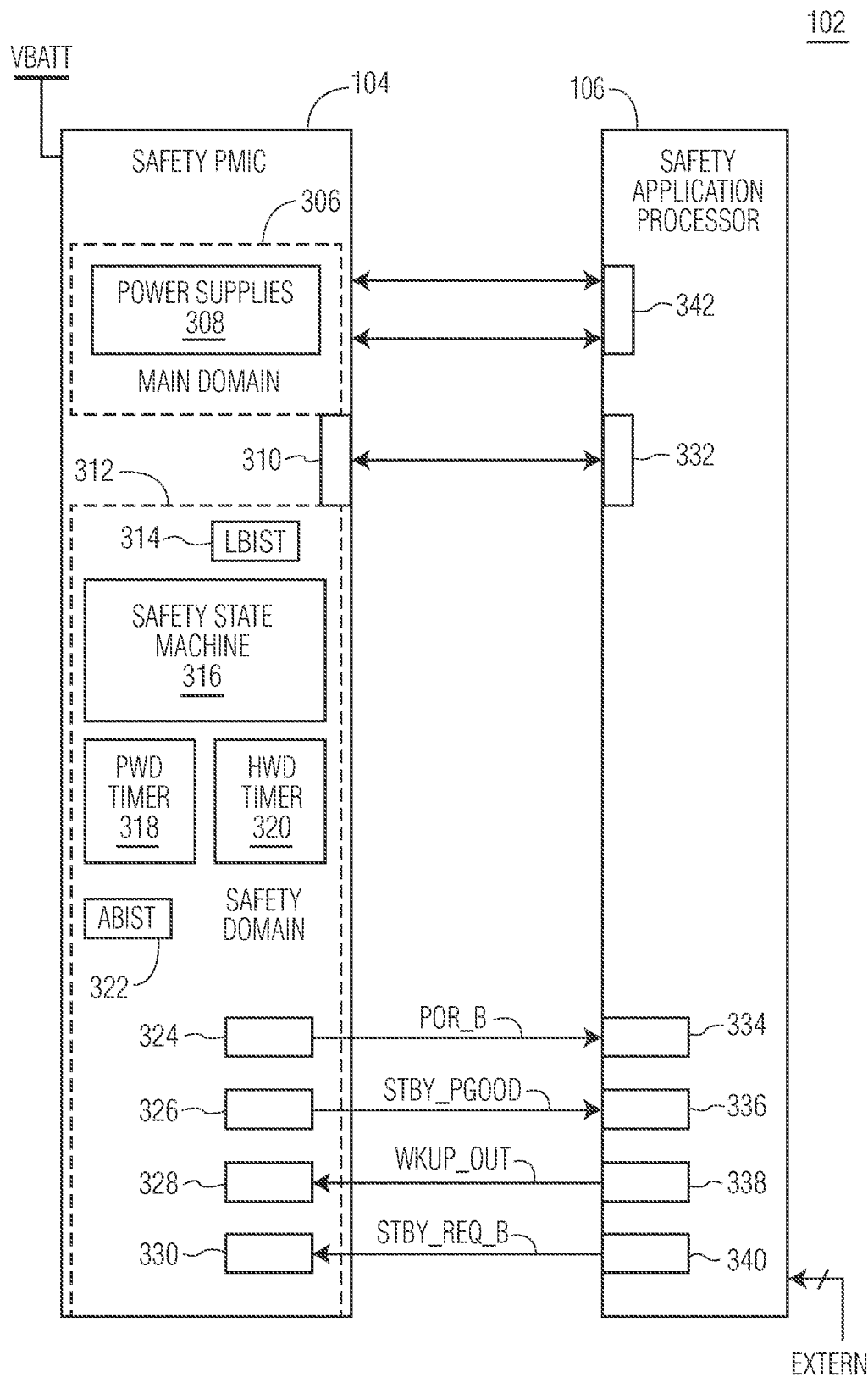
FIG. 3 illustrates, in block diagram form, more detailed versions of the PMIC and processor of FIG. 1, in accordance with one embodiment of the present invention.

FIG. 3 illustrates, in block diagram form, a more detailed version of processing system 102 with PM IC 104 and processor 106 (also referred to as an application processor), in accordance with one embodiment of the present invention. In the illustrated embodiment, processing system 102 is used with a safety critical device, and therefore, PMIC 104 may be referred to as a safety PM IC and processor 106 as a safety application processor. Note that only portions of the PM IC and processor which are needed for the discussion of various embodiments of the present invention are included in the illustrated embodiment of FIG. 3, so as not to complicate the drawings.

PM IC 104 is divided into three domains, main domain 306, communication interface 310, and safety domain 312. Main domain 306 includes circuitry which implements the power management functions, a power state machine to manage the power management functions, and all the power supplies 308. For example, in one embodiment, PM IC receives an input power supply voltage (e.g., VBATT) from a power source (e.g., a battery), and then provides the necessary supply voltage or supply voltages, using one or more voltage regulators, to processor 106. Communication interface 310 may be configured as a serial communications interface, such as, for example, the inter-integrated circuit (I2C) serial communication interface configured according to the I2C protocol, although any suitable communication interface may be used, such as, for example, a serial peripheral interface (SPI) or the like.

Safety domain 312 includes safety circuitry which implements the safety related functions and a safety state machine 316 which manages the safety related functions. Safety state machine 316 may also be referred to as safety control circuitry and may also include storage circuitry such as registers to store status and control information. Safety domain 312 also includes Logic Built-in Self Test (LBIST) circuitry 314 to check the integrity of safety state machine 316 and Analog Built-in Self Test (ABIST) circuitry 322 to check the integrity of analog elements of PM IC 104. Note that any LBIST and ABIST circuitries may be used. Safety domain 312 also includes a Power-on-Reset (POR_B) pin 324, a Standby Power Good (STBY_PGOOD) pin 326, a wakeup out (WKUP_OUT) pin 328, and a Standby Requests (STBY_REQ_B) pin 330. These pins (which may also be referred to as PMIC pins) communicate POR_B, STBY_PGOOD, WKUP_OUT, and STBY_REQ_B with corresponding pins (pins 334, 336, 338, and 340, respectively) of processor 106. (As used herein, WKUP_OUT and STBY_PGOOD are active high signals such that each is asserted to a logic level high and negated, or released, to a logic level low, while STBYREQ_B and POR_B are active low signals that are asserted to a logic level low and negated, or released, to a logic level high.) Safety domain 312 also includes PWD timer 318 which is used to implement periodic wakeups such that the processor 106 can be reset in case the STBY_REQ_B pin is never released. Safety domain 312 also includes HWD timer 320 which is used to reset processor 106 in case the WKUP_OUT pin is asserted (corresponding to the initial wakeup request) but the STBYREQ_B pin is not subsequently released (corresponding to the actual wakeup request) within a specific time.

Processor 106, as indicated above, includes pins 334-340 (which may be referred to as processor pins) which are connected to pins 324-330 of PMIC 104, respectively. Processor 106 also includes one or more voltage supply input pins 342 coupled to receive the supply voltage or voltages from power supplies 308 of PMIC 104. Processor 106 can use the one or more voltage supply input pins to provide one or more power rails to circuitry in one or more power domains within processor 106. For example, processor 106 may include an always-on power domain which includes circuitry that remains powered by a corresponding power rail during the low power mode (e.g., standby mode) of processor 106 while the remaining circuitry of processor 106 can be placed in a safe state and powered down (e.g., the corresponding power rails can be powered down). In the illustrated embodiment, the always-on power domain is coupled to pins 334-340 such that they are operable even when processor 106 is in low power mode.

Figure 4:
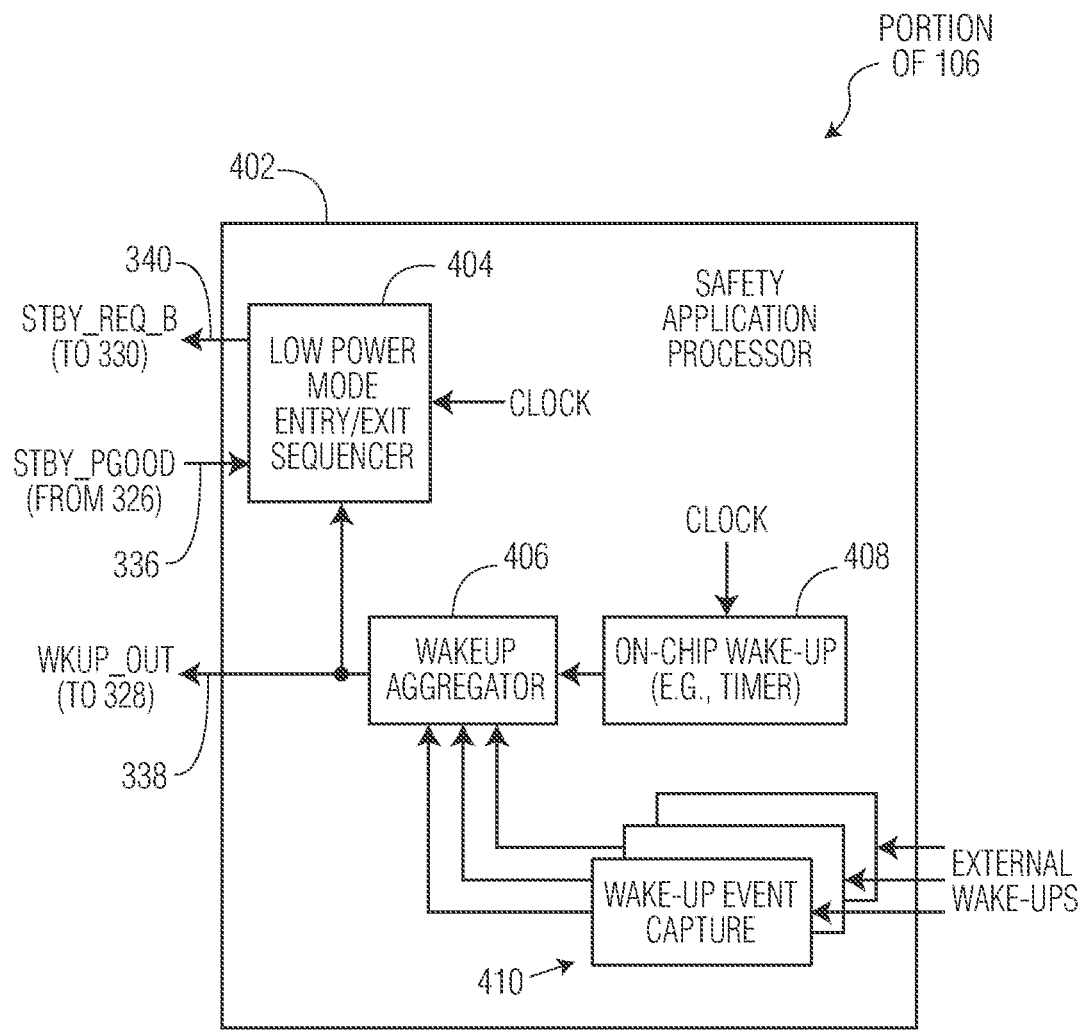
FIG. 4 illustrates, in block diagram form, a more detail version of a portion of the processor of FIG. 1, in accordance with one embodiment of the present invention.

FIG. 4 illustrates, in block diagram form, a portion of processor 106 which includes circuitry 402, located in the always-on power domain, used to manage entry into or exit from low power mode. Circuitry 402 is coupled to pin 340 to provide STBY_REQ_B to pin 330 of PMIC 104, to pin 336 to receive STBY_PGOOD from pin 326 of PMIC 104, and to pin 338 to provide WKUP_OUT to pin 328 of PMIC 104. Processor 106 can be woken up from the low-power mode due to external wakeup events (e.g., upon a change in a pin's log state) or due to an on-chip wakeup event (i.e., internal wakeup event) generated by on-chip circuitry 408 (e.g., a periodic wakeup timer such as a PWD timer). The external wakeup events occur external to processing system 102, while the on-chip wakeup events are events which occur within processing system 102. The external wakeup events are captured on-chip by wakeup event capture circuitry 410 and combined with the on-chip wakeup events by wakeup aggregator circuitry 406 (referred to as wakeup aggregator 406). The external wakeup events and on-chip wakeup events can be indicated by corresponding wakeup signals which are provided to aggregator 406. Note that on-chip circuitry 408 which generates on-chip wakeups may receive a clock signal, but wakeup event capture circuitry 410 receives external wakeups asynchronously (and thus does not receive the clock signal). Similarly, aggregator 406 also operates asynchronously, without a clock signal.

An output of wakeup aggregator 406 is provided to low power mode entry/exit sequencer 404 and as WKUP_OUT at pin 338, and is asserted to a logic level high whenever any of the external wakeup events is captured or an on-chip wakeup event is asserted. That is, assertion of the output of wakeup aggregator 406 provides a notification to both low power mode entry/exit sequencer 404 and PMIC 104 of the occurrence of a wakeup event. This notification is done in a fashion that does not require a clock signal. For example, in one embodiment, wakeup aggregator 406 can be implemented with a logical ORing of all the on-chip and external wakeup signals. The notification at the output of wakeup aggregator 406 is also provided to low-power mode entry/exit sequencer 404, which also receives the clock signal and controls entry into low-power mode and exit from low-power mode in accordance with the clock signal. In one embodiment, sequencer 404 is implemented with a state machine, and may also be referred to as low power mode entry/exit control circuitry.

In operation, when processor 106 is in low power mode and low power mode entry/exit sequencer 404 detects assertion of the output of wakeup aggregator 406 (which also asserts WKUP_OUT at pin 338), low power mode entry/exit sequencer 404 begins the low power exit sequence. During the low power mode exit sequence (i.e., after performing at least a portion of the low power mode exit sequence), low power mode entry/exit sequencer negates STBY_REQ_B at pin 340 to indicate that processor 106 has been properly prepared to exit the low power mode and thus requests PMIC 104 to officially exit standby mode and thus "wake up." PMIC 104 wakes up processor 106 by returning all the power supply voltages to their normal operating levels and then asserting STBY_PGOOD to indicate that the power supplies are reliable and ready for use. Further details will be described in reference to the timing diagrams below.

WKUP_OUT is asserted by wakeup aggregator 406 in response to the assertion of a first wakeup signal (a first wakeup signal is the first wakeup signal, whether from on-chip wakeup 408 or wakeup event capture 410, that is asserted before any other wakeup signals are asserted). Assertion of WKUP_OUT is used to therefore indicate occurrence of a wakeup event which merely begins the actual low power exit sequence for processor 106 (at this point, processor 106 is not yet ready to be powered up) and indicates to PM IC 104 of a pending exit from standby mode. Assertion of WKUP_OUT is therefore referred to as the initial (or raw or unqualified) wakeup request since it is asserted to indicate a wakeup event without any qualification of the wakeup event from low power mode entry/exit sequencer 404 (in which assertion of WKUP_OUT triggers HWD timer 320 in PM IC 104). Upon occurrence of a wakeup event, this unqualified initial wakeup request is provided earlier in time than the subsequently negated STBY_REQ_B signal which is provided during (and thus qualified by) the low power mode exit sequence, indicating processor 106 is ready to exit standby mode. Therefore, if operating correctly, assertion of WKUP_OUT should always be followed, within a predetermined window of time, by negation (i.e., release) of STBY_REQ_B.

However, in the case of a fault, STBY_REQ_B may fail to be negated (i.e., an actual wakeup request may not follow the initial wakeup request). For example, the fault may be due to a broken clock to low power mode entry/exit sequencer 404. A fault which affects low power mode entry/exit sequencer 404, though, would not prevent WKUP_OUT from being asserted, meaning, even with occurrence of a fault affecting low power mode exit/entry sequencer 404, PMIC 104 would still be notified of the wakeup event (due to the initial or raw wakeup request). In one embodiment, to reduce the likelihood that a fault in wakeup aggregator 406 would prevent both low power mode entry/exit sequencer 404 from being notified of a wakeup event and WKUP_OUT being asserted in response to the wakeup event, wakeup aggregator 406 can be duplicated such that the low power mode entry/exit sequencer 404 and pin 338 receive their signaling from separate but logically equivalent aggregators. Also, note that not only are the wakeup event capture and aggregation mechanisms not clocked, they are logically separated from the low power mode entry/exit sequencer which ensures that there are no common cause faults between these, at least at the logic level.

Figure 5:
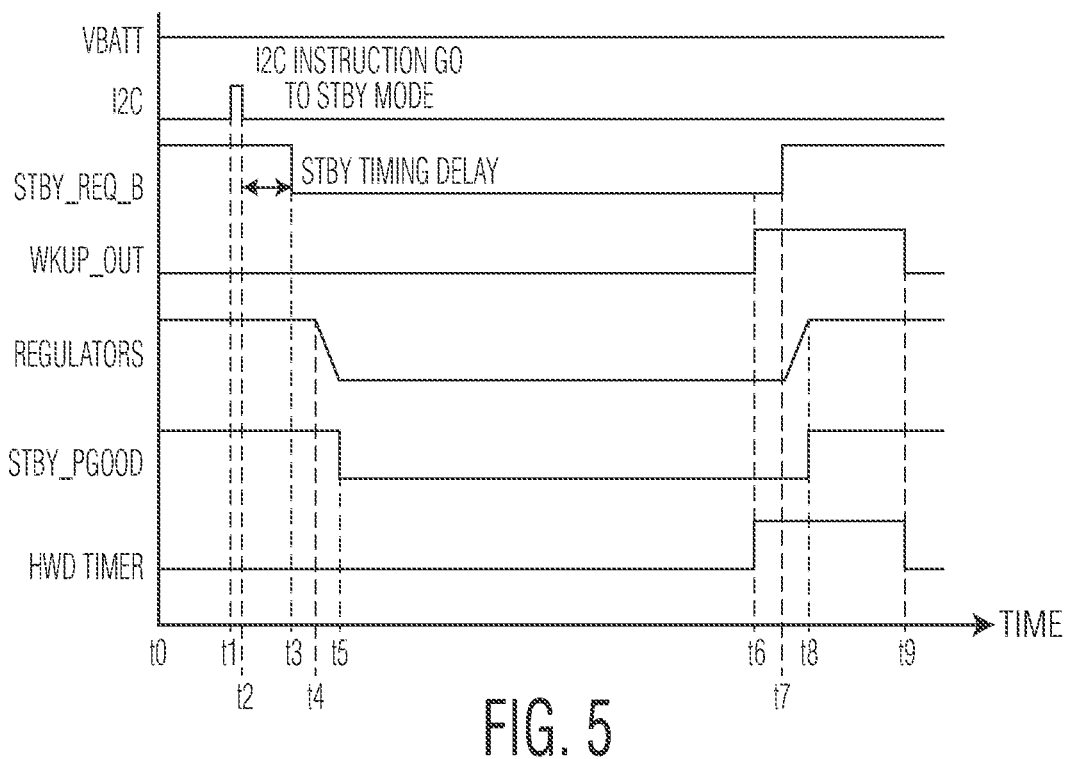
FIGS. 5 and 6 illustrate timing diagrams of various signals within the processing system of FIG. 1, in accordance with one embodiment of the present invention.

FIG. 5 illustrates a timing diagram for various signals of processing system 102 in which no fault occurs, in accordance with one embodiment of the present invention. At time t0, processor 106 is operating in normal mode. That is, processor 106 is awake and fully powered, therefore STBY_REQ_B is negated (at a logic level high), WKUP_OUT is negated (at a logic level low), and STBY_P-GOOD is asserted (at a logic level high). At this time, HWD has been reset with its timer value corresponding to the maximum allowable time between the initial wakeup request to PM IC 104 and the actual wakeup request to PMIC 104. During the execution of instructions, processor 106 can execute an instruction which requests that processor 106 go to low power mode. At time t1, processor 106 provides the instruction to PMIC 104, via communication interface 332 and 310 (e.g., 120). At time t2, the communication of the instruction is complete and at a standby timing delay later, at time t3, low power mode entry/exit sequencer 404 of processor 106 asserts STBY_REQ_B (to a logic level low) to request entry into standby mode by PM IC 104. Upon assertion of STBY_REQ_B, processor 106 has been safe stated (during, e.g., the standby delay time) and thus is prepared for safe entry into low power mode due to the low power mode entry process performed by low power mode entry/exit sequencer 404. At time t4, in response to assertion of STBY_REQ_B, PMIC 104 lowers or turns off power supplies 308. Once the power supplies are at the appropriate levels (e.g., off) for standby mode, PM IC 104 negates (i.e., releases) STBY_PGOOD to a logic level low (at time t5). PMIC 104 is now in standby mode and processor 106 is operating in low power mode.

At time t6, a wakeup signal at wakeup aggregator 406 is asserted (due to either an external or on-chip wakeup event), resulting in assertion of WKUP_OUT. Assertion of WKUP_OUT provides the initial wakeup request and triggers HWD timer 320 to start counting (indicated by the HWD timer signal of FIG. 5 going to a logic level high). At time t7, processor 106 releases STBY_REQ_B (back to a logic level high). In response to the release of STBY_REQ_B, PMIC 104 brings the voltage levels to their normal operating levels. Once the voltage levels are restored, at time t8, PMIC 104 asserts STBY_PGOOD (back to a logic level high). In this example, HWD timer did not expire prior to release of STBY_REQ_B, therefore no fault was indicated. At time t9, processor 106 is back in normal operating mode and WKUP_OUT is negated and HWD timer 320 is serviced and reset to its time-out value.

Figure 6:
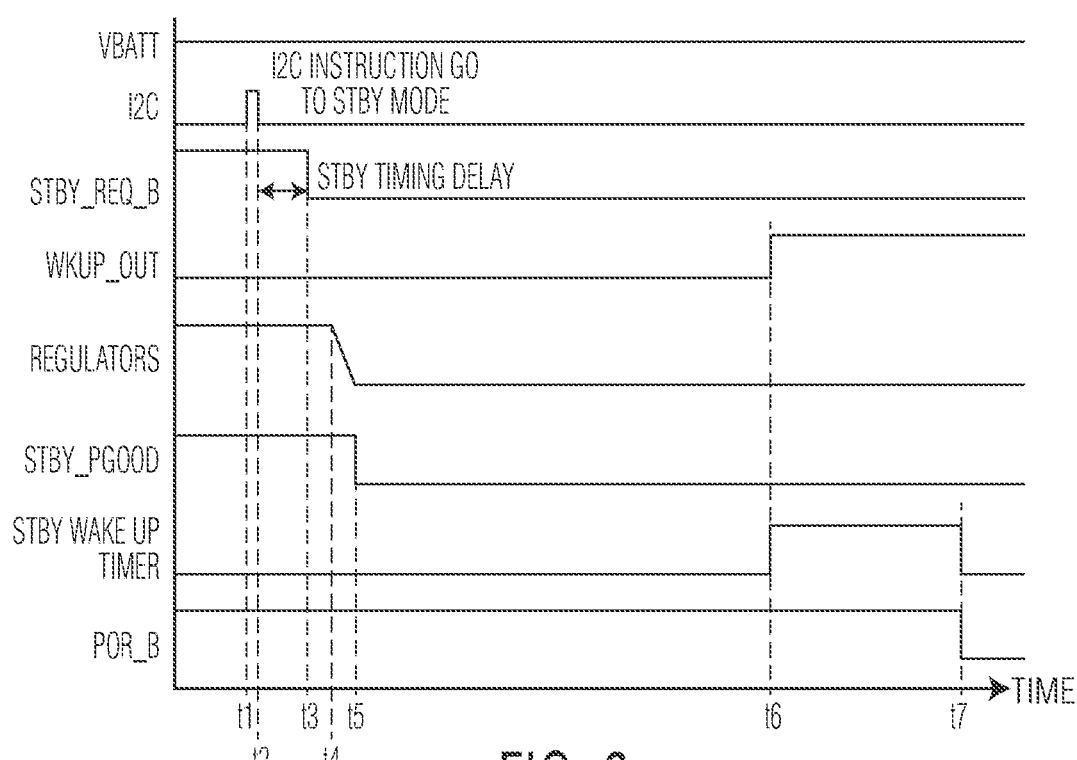

FIG. 6 illustrates a timing diagram for various signals of processing system 102 in which a fault does occur, in accordance with one embodiment of the present invention. FIG. 6 illustrates the same signals as FIG. 5, but with the addition of POR_B. The state of the signals at times t0-t6 are the same as was described above in reference to FIG. 5. Therefore, at time t6, processor 106 asserts WKUP_OUT which triggers HWD timer 320 to begin counting. In this example, though, HWD timer 320 expires at time t7 (indicated by the HWD timer signal of FIG. 6 going back to a logic level low). At this point, though, STBY_REQ_B has not been released and remains at a logic level low. A fault is therefore indicated since an actual wakeup request (e.g., release of STBY_REQ_B) did not happen within a predetermined amount of time (corresponding to the timer value of HWD timer 320) of the initial or raw wakeup request (e.g., assertion of WKUP_OUT). In this case, due to the expiration of HWD timer 320, PM IC 104 asserts POR_B (to a logic level low) to cause a reset and power-up cycle, even without a qualified wakeup event. In this manner, PMIC 104 and processor 106 do not stay indefinitely in the standby (low power) mode. The fault can be stored inside a PMIC registers for further debugging.

Figure 7:
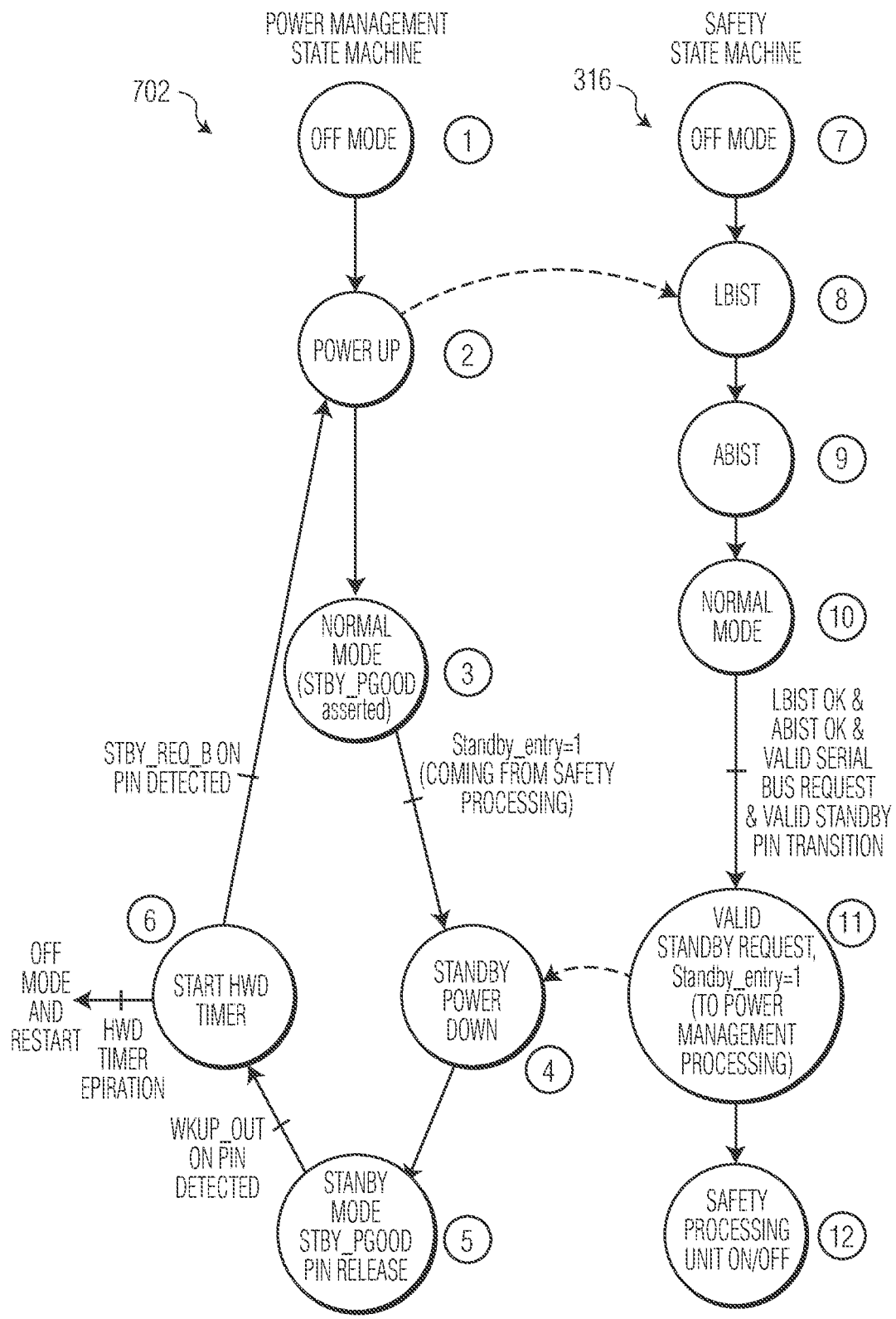
FIG. 7 illustrates a more detailed state diagram for the PMIC of FIG. 1, in accordance with one embodiment of the present invention.

FIG. 7 illustrates state transitions at the PMIC level for PMIC 104. States 1-6 on the left side correspond to a power management state machine (power SM) 702 of main domain 306 in PM IC 104, and states 7-12 on the right side correspond to safety state machine (safety SM) 316 of safety domain 312 in PM IC 104. In each of states 1 and 7, processor 106 is in OFF mode in which all regulators are off, and system 102 is in a safe state, including processor 106 which is under reset. Upon power-up, power SM 702 transitions to state 2 in which PMIC 104 begins its defined power-up (i.e., start-up) sequence which includes starting the power supplies. Upon power-up, safety SM 316 transitions into state 8 in which LBIST 314 performs integrity checks of the safety processing logic in PMIC 104, and then to state 9 in which ABIST 322 ensures that the analog safety circuitry are working properly in PMIC 104 and that the safety pins (e.g., pins 324 and 326) are held at a logic level high. Upon completion of the power up sequence, power SM 702 transitions to state 3, in which processor 106 operates in normal mode. At this point, all regulators have stabilized in their normal range, and from this state, power SM 702 is ready to go into standby mode, when needed (e.g., when an order to do so is received from safety SM 316). Similarly, after ABIST is complete, safety SM 316 also transitions into normal mode (state 10) in which the safety processing logic is in normal mode as well such that all safety circuitry is active and can confirm that processor 106 is up and running (including, e.g., setting watchdog timers as needed, including resetting HWD timer 320 to its timeout value and, if used, resetting PWD timer 318 to its timeout value). At this point, the safety circuitry is ready to enter standby mode, when needed (e.g., when a command to do so is received from processor 106).

For the transition to standby mode, state 10 transitions to state 11. In order for safety SM 316 to transition to state 11, though, LBIST (state 8) and ABIST (state 9) have to have been successfully passed and a valid serial bus request must be received via communication interface 310. For example, processor 106, in response to execution of an instruction, sends a request to enter standby mode by writing a dedicated key into a dedicated register in safety domain 312 of PMIC 104 (which was previously tested by LBIST). If the request from processor 106 is deemed valid by safety domain 312, STBY_REQ_B (at pin 330) is asserted (to a logic level low). Therefore, state 11 of safety PM 316 corresponds to receiving a valid standby request such that standby_entry=1, in which the value of standby_entry is provided to power SM 702. Continuing with safety SM 316, state 11 transitions to state 12 in which a functional state indicator pin can be asserted to transition the processing system into a safe state such that it can be powered OFF.

With respect to power SM 702, state 3 transitions to state 4 upon the detection of the valid standby mode entry request (in response to standby_entry=1) in which any regulator which is disabled in standby mode is powered down. (If PWD timer 318 is being used, it is started in state 4 as well.) When all disabled regulator output voltages are below a certain low-level threshold, power SM 702 transitions to state 5, in which power SM 702 is in standby mode, corresponding to the lowest quiescent current of system 102. For standby mode, STBY_PGOOD at pin 326 is released (to a logic level low) to inform processor 106 that PMIC 104 is in the standby state, ready for a next wakeup.

When processor 106 detects a first wakeup event (either on-chip or external wakeup event), processor 106 asserts WKUP_OUT, as was discussed above. Upon assertion of WKUP_OUT, power SM 702 transitions to state 6 in which power SM 702 starts HWD timer 320. That is, in state 6, timer 320 actually starts operating by counting down its timeout value in accordance with a clock available to safety domain 312. If no fault occurs, STBY_REQ_B is subsequently negated to a logic level high (e.g., by low-power mode exit/entry sequencer 404 of processor 106) within the expected amount of time. Power SM 702 detects the negation of STBY_REQ_B and transitions back to state 2, in which the power-up sequence is repeated, as described above. However, if HWD timer 320 expires while in state 6 (such that negation of STBY_REQ_B is not detected before HWD timer 320 expires), PMIC 104 asserts POR_B so as to transition back to the OFF mode so that a full reset of processor 106 is initiated. In this case, a register in the circuitry implementing SM 316 or 702 may be used to record that the occurrence of the POR was due to a fault in HWD timer 320.

Therefore, by now it should be appreciated that an improved mechanism for handling wakeup requests, including an improved low power mode exit handshake between a PMIC and a processor, has been provided through the use of a handshake watchdog timer in which faults in the detection of wakeup events can be better identified and addressed. The handshake timer is used to determine whether an initial unqualified wakeup request (e.g., via WKUP_OUT) is followed, as expected, by an actual qualified wakeup request (e.g., via STBY_REQ_B) within a predetermined window of time from the initial wakeup request. The initial wakeup request can be provided in response to an initial detection of a wakeup event, in which the initial detection of the wakeup event also triggers an exit from standby mode sequence in the processor, during which the actual qualified wakeup request should be generated. A fault is indicated if the actual qualified wakeup request is not received by the PM IC prior to the hardware watchdog time expiring. Also, the initial wakeup request disclosed herein can also be provided to the PM IC without a clock signal, such that failures of the clock does not prevent the PMIC from resetting the processor as needed.

The use of a handshake watchdog timer prevents the need for having a traditional PM IC periodic watchdog timer engaged in order to ensure periodic wakeups (regardless of whether any wakeup event has been detected), in which the processor is charged at each periodic wakeup to service the timer. For example, the PWD timer can be repurposed instead as a fail-safe timer with a significantly longer timeout duration, thus providing additional robustness without power consumption increase. In contrast, the handshake watchdog timer only needs to be started in response to a detected wakeup event. In this manner, the use of the handshake watchdog timer may also allow for the reduction of the number of times the processor needs to be charged up during lower mode as compared to the use of the periodic watchdog timer. Therefore, use of the handshake watchdog timer may allow for the reduction of the overall power consumption.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by the description, a bar over the signal name, or "_B" following the name. In the case of a negative logic signal, the signal is active low where the logically true state corresponds to a logic level low (e.g., a logic level zero). In the case of a positive logic signal, the signal is active high where the logically true state corresponds to a logic level high (e.g., a logic level one). Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Also, for example, in one embodiment, the illustrated elements of system 102 are circuitry located within a same device. In one example, system 102 may include any number of separate integrated circuits or separate devices interconnected with each other. For example, PMIC 104 and processor 106 may be separate integrated circuits or a memory of system 102 may be located on a same integrated circuit as processor 106 or on a separate integrated circuit or located within another peripheral discretely separate from other elements of system 102.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

All or some of the software or instructions described herein may be received elements of system 102, for example, from computer readable media such as memory or other media on other computer systems. Such computer readable media may be permanently, removably or remotely coupled to an information processing system such as system 102. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

Although the invention is described herein with reference to specific embodiments, various modifications and changes can be made without departing from the scope of the present invention as set forth in the claims below. For example, the format of the initial or raw wakeup request and the actual or qualified wakeup request may differ. For example, different pins or combination of pins or different input/outputs or different signaling may be used to provide this information. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The following are various embodiments of the present invention.

In one embodiment, a processing system includes power management circuitry including a handshake watchdog (HWD) timer, a first input, and a second input, wherein the power management circuitry is configured to, upon a reset, set the HWD timer to a maximum delay time allowed between an initial wakeup request received at the first input and a qualified wakeup request expected at the second input and configured to start the HWD timer counting in response to the initial wakeup request; and processing circuitry coupled to the power management circuitry. The processing circuitry includes a wakeup signal aggregator configured to receive wakeup signals from internal wakeup events and external wakeup events and configured to provide a notification of an occurrence of a wakeup event corresponding to any one of the received wakeup signals, wherein the notification is provided as the initial wakeup request to the power management circuitry; and a low power mode sequencer configured to initiate a low power mode exit sequence in response to the notification from the wakeup signal aggregator and configured to provide the qualified wakeup request as a result of performing at least a portion of the low power mode exit sequence. In one aspect, the initial wakeup request and the qualified wakeup request both result from the wakeup event. In another aspect, the power management circuitry is configured to reset the processing circuitry in response to the HWD timer expiring without having received the qualified wakeup request expected at the second input. In another aspect, the power management circuitry further comprises a power supply configured to provide a power supply voltage to the processing circuitry, wherein, during a standby mode, the power supply is turned off. In a further aspect, the power management circuitry is configured to power up the power supply voltage to exit standby mode in response to the qualified wakeup request and not the initial wakeup request. In yet another aspect, the initial wakeup request is not generated as part of the low power mode exit sequence. In another aspect, the notification provided by the wakeup signal aggregator and the initial wakeup request are provided without use of clock signal. In another aspect, the power management circuitry further includes a periodic watchdog (PWD) timer, wherein the power management circuitry is configured to, while in standby mode, power up to service the PWD timer each time the PWD timer expires, regardless of whether a wakeup event has occurred or not. In a further aspect, servicing the PWD timer includes setting the PWD timer to a maximum delay time allowed between wakeups. In yet another aspect, the internal wakeup events occur within the processing system and are further characterized as on-chip wakeup events.

In another embodiment, in a processing system having power management circuitry and a processor, a method includes entering standby mode; receiving, at the power management circuitry, an initial wakeup request from the processor, wherein the initial wakeup request is generated by the processor in response to detecting occurrence of a wakeup event; starting a handshake watchdog (HWD) timer counting by the power management circuitry in response to receiving the initial wakeup request; and, in response to receiving, at the power management circuitry, a qualified wakeup request prior to the HWD timer expiring, wherein the qualified wakeup request is generated by the processor during a low power mode exit sequence performed in response to the initial wakeup request, exiting standby mode. In one aspect, the method further includes, in response to the HWD timer expiring without having received the qualified wakeup request, performing a reset of the processing system. In a further aspect, the exiting standby mode further includes powering up a power supply voltage of the processor, in response to the qualified wakeup request, to exit the standby mode. In yet a further aspect, the power supply voltage is not powered up in response to the initial wakeup request. In another aspect of another embodiment, the method further includes, upon powering up to enter normal mode, setting the HWD timer a maximum delay time allowed between any initial wakeup request and its corresponding qualified wakeup request. In a further aspect, the method further includes, upon powering up to enter normal mode, setting a periodic watchdog (PWD) timer to a maximum delay time allowed between wakeups; starting the PWD timer counting in response to entering the standby mode; and, in response to the periodic watchdog timer expiring, resetting the processing system, regardless of whether any wakeup event has occurred or not. In yet another aspect of the another embodiment, the method further includes starting, by the processor, the low power mode exit sequence in response to the initial wakeup request. In another aspect, the wakeup event is one of an internal wakeup event or an external wakeup event.

In yet another embodiment, a processing system includes a power management integrated circuit (PMIC) including a handshake watchdog (HWD) timer, a first PM IC pin, and a second PM IC pin, wherein the power management circuitry is configured to, upon a reset, set the HWD timer to a maximum delay time allowed between an initial wakeup request received at the first PM IC pin and a qualified wakeup request expected at the second PMIC pin and configured to start the HWD timer counting in response to the initial wakeup request at the first PM IC pin; and an application processor coupled to the PMIC. The processor includes a first processor pin and a second processor pin; a wakeup signal aggregator configured to receive wakeup signals from on-chip wakeup events and external wakeup events and configured to asynchronously provide a notification of an occurrence of a wakeup event corresponding to any one of the received wakeup signals, wherein the notification is provided as the initial wakeup request from the first processor pin to the first PMIC pin; and a low power mode sequencer configured to initiate a low power mode exit sequence in response to the notification from the wakeup signal aggregator and configured to provide the qualified wakeup request as a result of performing at least a portion of the low power mode exit sequence, wherein the qualified wakeup request is provided from the second processor pin to the second PM IC pin. In one aspect, the PMIC further includes a power supply configured to provide a power supply voltage to a power supply pin of the processor, wherein, during a standby mode, the power supply is turned off, and wherein the PM IC is further configured to power up the power supply voltage to exit standby mode in response to the qualified wakeup request and maintain the power supply off in response to the initial wakeup request.

The invention claimed is:

1. A processing system comprising:
power management circuitry comprising a handshake watchdog (HWD) timer, a first input, and a second input, wherein the power management circuitry is configured to, upon a reset, set the HWD timer to a maximum delay time allowed between an initial wakeup request received at the first input and a qualified wakeup request expected at the second input and configured to start the HWD timer counting in response to the initial wakeup request; and
processing circuitry coupled to the power management circuitry, the processing circuitry comprising:
a wakeup signal aggregator configured to receive wakeup signals from internal wakeup events and external wakeup events and configured to provide a notification of an occurrence of a wakeup event corresponding to any one of the received wakeup signals, wherein the notification is provided as the initial wakeup request to the power management circuitry; and
a low power mode sequencer configured to initiate a low power mode exit sequence in response to the notification from the wakeup signal aggregator and configured to provide the qualified wakeup request as a result of performing at least a portion of the low power mode exit sequence.

2. The processing system of claim 1, wherein the initial wakeup request and the qualified wakeup request both result from the wakeup event.

3. The processing system of claim 1 or 2, wherein the power management circuitry is configured to reset the processing circuitry in response to the HWD timer expiring without having received the qualified wakeup request expected at the second input.

4. The processing system of claim 1, wherein the power management circuitry further comprises a power supply configured to provide a power supply voltage to the processing circuitry, wherein, during a standby mode, the power supply is turned off.

5. The processing system of claim 4, wherein the power management circuitry is configured to power up the power supply voltage to exit standby mode in response to the qualified wakeup request and not the initial wakeup request.

6. The processing system of claim 1, wherein the initial wakeup request is not generated as part of the low power mode exit sequence.

7. The processing system of claim 1, wherein the notification provided by the wakeup signal aggregator and the initial wakeup request are provided without use of clock signal.

8. The processing system of claim 1, wherein the power management circuitry further comprises:
a periodic watchdog (PWD) timer, wherein the power management circuitry is configured to, while in standby mode, power up to service the PWD timer each time the PWD timer expires, regardless of whether a wakeup event has occurred or not.

9. The processing system of claim 8, wherein servicing the PWD timer includes setting the PWD timer to a maximum delay time allowed between wakeups.

10. The processing system of claim 1, wherein the internal wakeup events occur within the processing system and are further characterized as on-chip wakeup events.

11. A method for use in a processing system having power management circuitry and a processor, comprising:
  entering standby mode;
  receiving, at the power management circuitry, an initial wakeup request from the processor, wherein the initial wakeup request is generated by the processor in response to detecting occurrence of a wakeup event;
  starting a handshake watchdog (HWD) timer counting by the power management circuitry in response to receiving the initial wakeup request; and
  in response to receiving, at the power management circuitry, a qualified wakeup request prior to the HWD timer expiring, wherein the qualified wakeup request is generated by the processor during a low power mode exit sequence performed in response to the initial wakeup request, exiting standby mode.

12. The method of claim 11, further comprising:
  in response to the HWD timer expiring without having received the qualified wakeup request, performing a reset of the processing system.

13. The method of claim 12, wherein the exiting standby mode further comprises:
  powering up a power supply voltage of the processor, in response to the qualified wakeup request, to exit the standby mode.

14. The method of claim 13, wherein the power supply voltage is not powered up in response to the initial wakeup request.

15. The method of claim 11, further comprising:
  upon powering up to enter normal mode, setting the HWD timer a maximum delay time allowed between any initial wakeup request and its corresponding qualified wakeup request.

16. The method of claim 15, further comprising:
  upon powering up to enter normal mode, setting a periodic watchdog (PWD) timer to a maximum delay time allowed between wakeups;
  starting the PWD timer counting in response to entering the standby mode; and
  in response to the periodic watchdog timer expiring, resetting the processing system, regardless of whether any wakeup event has occurred or not.

17. The method of claim 11, further comprising:
  starting, by the processor, the low power mode exit sequence in response to the initial wakeup request.

18. The method of claim 11, wherein the wakeup event is one of an internal wakeup event or an external wakeup event.

19. A processing system comprising:
  a power management integrated circuit (PMIC) comprising a handshake watchdog (HWD) timer, a first PMIC pin, and a second PMIC pin, wherein the power management circuitry is configured to, upon a reset, set the HWD timer to a maximum delay time allowed between an initial wakeup request received at the first PMIC pin and a qualified wakeup request expected at the second PMIC pin and configured to start the HWD timer counting in response to the initial wakeup request at the first PMIC pin; and
  an application processor coupled to the PMIC, the processor comprising:
    a first processor pin and a second processor pin;
    a wakeup signal aggregator configured to receive wakeup signals from on-chip wakeup events and external wakeup events and configured to asynchronously provide a notification of an occurrence of a wakeup event corresponding to any one of the received wakeup signals, wherein the notification is provided as the initial wakeup request from the first processor pin to the first PMIC pin; and
    a low power mode sequencer configured to initiate a low power mode exit sequence in response to the notification from the wakeup signal aggregator and configured to provide the qualified wakeup request as a result of performing at least a portion of the low power mode exit sequence, wherein the qualified wakeup request is provided from the second processor pin to the second PMIC pin.

20. The processing system of claim 19, wherein the PMIC further comprises a power supply configured to provide a power supply voltage to a power supply pin of the processor, wherein, during a standby mode, the power supply is turned off, and wherein:
  the PMIC is further configured to power up the power supply voltage to exit standby mode in response to the qualified wakeup request and maintain the power supply off in response to the initial wakeup request.

* * * * *